UNITED STATES PATENT OFFICE.

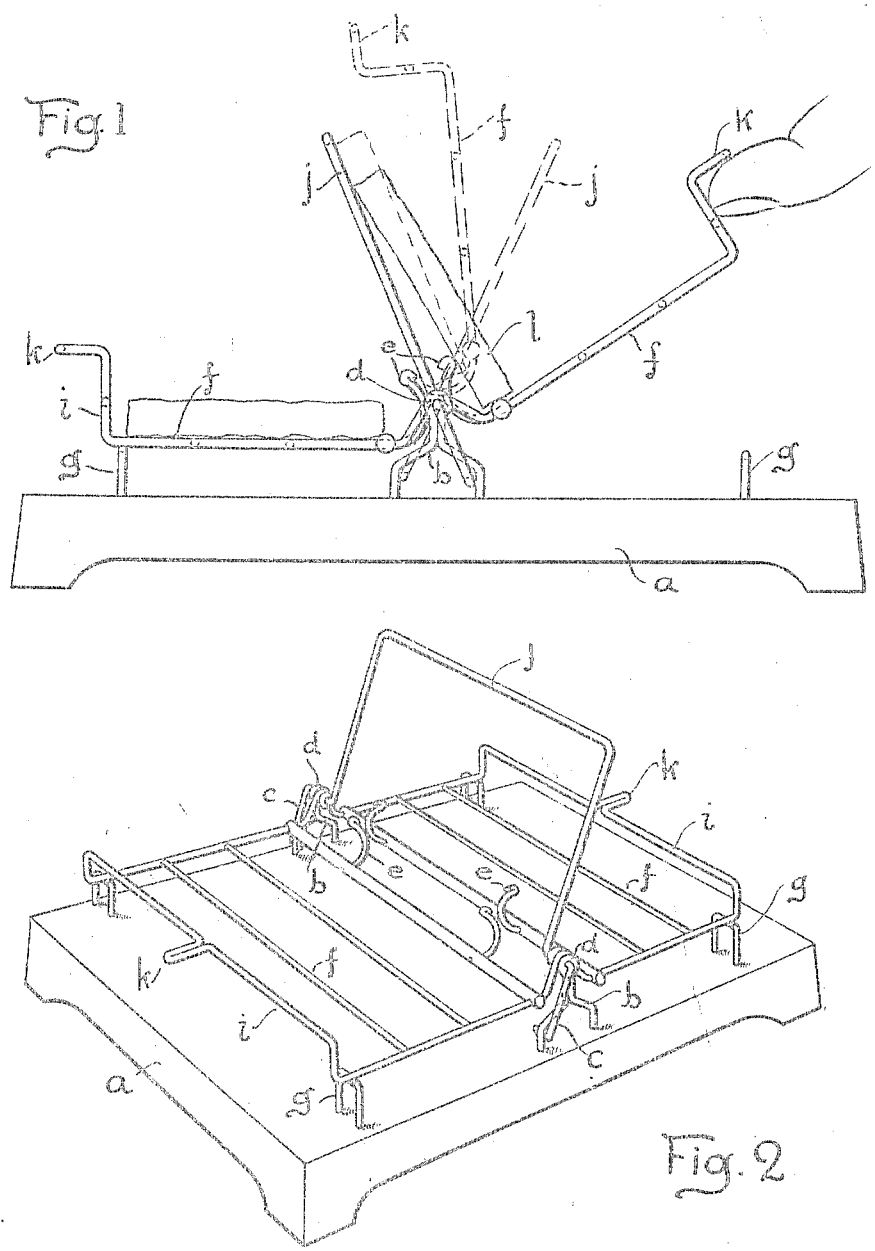

LLOYD GROFF COPEMAN, OF FLINT, MICHIGAN, ASSIGNOR TO COPEMAN ELECTRIC STOVE COMPANY, OF FLINT, MICHIGAN, A CORPORATION OF MICHIGAN.

TOAST-TURNER.

1,108,553.   Specification of Letters Patent.   Patented Aug. 25, 1914.

Application filed June 13, 1913. Serial No. 773,423.

*To all whom it may concern:*

Be it known that I, LLOYD G. COPEMAN, a citizen of the United States, residing at Flint, County of Genesee, State of Michigan, have invented a certain new and useful Improvement in Toast-Turners, and declare the following to be a full, clear, and exact description of the same, such as will enable others skilled in the art to which it pertains to make and use the same, reference being had to the accompanying drawings, which form a part of this specification.

This invention relates to toast-turners and has for its object a toast-turner which is adapted for turning toast on a horizontal toaster.

The structure which I employ may be used to turn two pieces as well as one.

In the drawings: Figure 1, is a side elevation of a toaster provided with my toast-turning device. Fig. 2, is a perspective of the same.

The toast-turner may be applied to any horizontal toaster. I have shown a form of toaster which comprises simply a block $a$, upon which the resistance or heating coils are set. From this block, on either side of the center, rises a post $b$, which is bifurcated at the bottom. These bifurcated portions act as stops for the arm $c$ which is journaled in the end $d$ of the post $b$. This arm $c$ continues on in a parallel path, then crosses to the other side of the toaster where it is similarly journaled in the opposite post $b$ and has another arm which is lettered $c$. This forms a surface to temporarily hold the toast while it is being turned. This member serves to support the toast in an inclined position while it is being kicked over by the trips $e$ that are attached to the pivoted grids $f$. These grids $f$ are pivoted to the wire which connects the arms $c$ with the upright member $j$. Staples $g$ rise from the toaster and support the grids $f$ at the corners. The border wires of the grid $f$ are offset from a common plane to form lips $i$ which prevent the bread sliding off the ends of the grids. The turning-surface or upright member $j$ can oscillate through a limited arc. This oscillation is, however, circumscribed by the arm $c$ which is confined between the two bifurcated portions of the standard $b$.

When the bread is laid upon the pivoted grid, it may be raised against the upright surface $j$. If the upright surface is in position shown in the dotted lines of Fig. 1, the grid may be raised against it and the upright surface $j$ forced over to the inclined position shown in the full lines of Fig. 1. The bread $l$ is then tipped. The pivoted grid $f$ is allowed to return to its initial position. This will bring the trips $e$ against the bottom of the bread and force the bottom out. When the pivoted grid is returned to the horizontal the bread will slide down the incline of the upright member $j$ and over the trips $e$ back onto the pivoted grid, but in an inverted position. The same action may be performed by the grid on the other side of the toaster. It is apparent that the surface $j$ performs a double function in connection with the two pivoted grids by reason of its limited range of oscillation. It will, however, be evident that with a single pivoted grid, the surface $j$ could be fixed.

The trips $e$ on the two pivoted grids are arranged so that they do not come opposite each other so as to interfere. The wire forming the offset or the lips $i$ is bent also to form the handles $h$ by which the pivoted grids may be raised.

What I claim is:—

1. The combination with a horizontal toaster provided with a horizontally disposed base, of a toast-turner comprising a pivoted surface for retaining the toast in horizontal position over the base, an upright surface for temporarily retaining the toast when the same has been thrown against such surface by raising the pivoted surface, and trips attached to the pivoted surface for forcing the lower end of the toast outward to invert it upon the pivoted surface when the same is returned to the horizontal, substantially as described.

2. The combination with a horizontal toaster provided with a horizontally disposed base, of a pivoted surface for retaining the toast over the base in a substantially horizontal position, an inclined upright surface against which the toast may be thrown by raising the pivoted surface, and means for causing the toast or bread to slide down the inclined surface when the pivoted surface is returned to its substantially horizontal position.

3. The combination with a horizontal toaster provided with a horizontally disposed base, of a pivoted grid for normally holding the toast over the base, an upright surface inclined from the vertical and away from said pivoted grid, and means for causing the toast or bread to slide down the said inclined upright surface when the pivoted grid has thrown the bread or toast against such upright surface and has returned to its initial position.

4. The combination with a horizontal toaster provided with a horizontally disposed base, of a pair of pivoted surfaces, a pivoted upright surface adapted to oscillate through a limited arc so as to bring it into position inclined away from the vertical as regards either pivoted surface, and means for causing the bread or toast to slide down the said upright surface when the bread or toast has been thrown against the inclined upright surface and said pivoted surface that has thrown the bread against the upright surface returns to its initial position.

5. The combination with a horizontal toaster provided with a horizontally disposed base, of a bifurcated post rising from the toaster, an upright surface pivoted in said post, an arm attached to said surface and adapted to swing between the bifurcated portion of said posts, and a pair of pivoted surfaces arranged on either side of the upright member and adapted to normally rest in substantially horizontal position above the horizontally disposed base, substantially as described.

In testimony whereof, I sign this specification in the presence of two witnesses.

LLOYD GROFF COPEMAN.

Witnesses:
  VIRGINIA C. SPRATT,
  AMELIA C. KOEHN.